United States Statutory Invention Registration [19]

[11] Reg. Number: H562

Trachier et al. [43] Published: Dec. 6, 1988

[54] ACCURATE ELECTRONIC THERMOMETER

[76] Inventors: Gary M. Trachier, R.F.D. #1 Box 252, Hartland, Vt. 05048-9740; James S. Morse, Kidder Rd., Bradford, Vt. 05033

[21] Appl. No.: 935,993

[22] Filed: Nov. 28, 1986

[51] Int. Cl.[4] ..... G01K 7/00; G06F 15/32

[52] U.S. Cl. ..... 364/557; 374/101

[58] Field of Search ..... 364/557; 374/100, 101, 374/141, 142, 172, 173; 324/57 R, 58.5 R, 62, 65 R

[56] References Cited

U.S. PATENT DOCUMENTS

| | | | |
|---|---|---|---|
| 3,316,765 | 5/1967 | Trolander et al. | 374/172 |
| 3,339,414 | 9/1967 | Coor | 374/172 |
| 3,842,674 | 10/1984 | Wilbur et al. | 73/362 AR |
| 3,906,338 | 9/1975 | Grindheim | 323/75 N |
| 3,934,476 | 1/1976 | Lamb, II | 73/362 AR |
| 3,973,147 | 8/1976 | Yu | 307/310 |
| 4,060,815 | 11/1977 | Scott | 364/557 |
| 4,161,880 | 7/1979 | Prosky | 364/557 |
| 4,205,327 | 5/1980 | Dahlke | 340/208 |
| 4,206,648 | 6/1980 | Tuska et al. | 73/362 AR |
| 4,419,021 | 12/1983 | Terada et al. | 374/101 |
| 4,528,637 | 7/1985 | Smith | 364/557 |
| 4,562,554 | 12/1985 | Stixrud et al. | 364/557 |
| 4,592,000 | 5/1986 | Ishizaka | 364/557 |
| 4,644,481 | 2/1987 | Wada | 364/557 |
| 4,669,049 | 5/1987 | Kosednar et al. | 364/557 |

*Primary Examiner*—Stephen C. Buczinski
*Assistant Examiner*—Linda J. Wallace

[57] ABSTRACT

A device is disclosed for accurately measuring temperature electronically, having a resistance-type sensor, such as a thermistor, used with a constant current to develop a voltage thereacross. Operational amplifier circuits provide a linear relationship between sensor voltage and resistance. The sensor's calculated resistance is used in a microprocessor to solve a log-polynomial equation relating resistance to temperature. Software corrections compensate for temperature-related variations in the circuitry, and a keyboard permits entry of the polynomial coefficients relating the sensor's output to the measured temperature, to allow interchangeability of sensors. The components are packaged in a compact, waterproofed container to provide a rugged, portable instrument usable in extremes of climatic conditions and capable of maintaining high accuracy over a wide temperature range.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

35a
35b
36
37
14
40
40a
40b
42
42a
44
LM140K-15
LM120H-15
LM108
AD2702
VOLTAGE REFERENCE
VOLTAGE TO CURRENT CONVERTER
CURRENT TO VOLTAGE CONVERTER
Thermistor Hi
Thermistor Lo
To A/D Board
Ground
• BOARD EDGE TEST POINT.
* LOW TEMPERATURE COEFFICIENT PART.

ACCURATE ELECTRONIC THERMOMETER

BACKGROUND OF THE INVENTION

1. Field of the Invention

The invention relates generally to temperature measuring devices and, more particularly, to an electronic device for accurately measuring temperature using a resistance-type sensor and developing a linear relationship between resistance and temperature.

2. Description of the Prior Art

Precision thermometry is needed in many areas of research and process control. One area of research is the study of ice formation in rivers and streams, particularly frazil formation. It is well known that supercooling of water during frazil formation rarely exceeds 0.03° C., and never exceeds 0.05° C. An instrument capable of measuring temperature within at least 0.01° C. is required for an understanding of frazil formation Many other ice formation phenomena are also critically dependent on small changes of supercooling.

Known electronic thermometers generally use either a thermistor or a platinum resistance temperature device as the temperature sensor. Both are widely used and are known for their long-term stability. Thermistors, however, exhibit a much larger change in resistance per unit change of temperature, usually on the order of several Ohms per degree. This characteristic makes it easier to measure small changes in temperature. Because of its stability, durability and sensitivity, the thermistor is well suited for use in an electronic thermometer for the purposes noted above.

Two methods are commonly used to precisely measure resistance of the above thermal sensors the Wheatstone bridge, in which the unknown resistance is matched to a known resistance; and passage of a constant current through a thermistor while measuring the voltage across it, and calculating the resistance using Ohm's law. While these methods are well proven, they are inconvenient for determining temperature, especially in the field. First, the thermistor's resistance must be determined. Then the corresponding temperature is determined from a special table correlating resistance to temperature. Thus, a table must be available for each thermistor being used.

As examples of the prior art, Scott (U.S. Pat. No. 4,060,715), discloses a modified linearized bridge circuit for a sensor, which may be a platinum element, presenting an electrical resistance that relates to temperature by a second order polynomial, in which the conventional, manually-adjustable variable resistor is replaced by a feedback network having an operational amplifier.

Lamb (U.S. Pat. No. 3,934,476) discloses a circuit for an electronic thermometer in which one or more semiconductor diodes are connected in series with a thermistor to obtain a voltage nearly linearly related to temperature. The bridge circuit includes a reference resistance in series with a like number of identical diodes.

Dahlke (U.S. Pat. No. 4,205,327) provides a circuit for correcting the nonlinear output of a sensor, such as a temperature-sensing platinum resistive element. Nonlinear compensation is achieved by employing a non-linear sensor network to adjust a current source used to excite a bridge in which the sensor is connected, as a function of the sensed variable. The adjusted current offsets the output signal from the bridge to compensate for the sensor's nonlinearity.

The foregoing patents illustrate another shortcoming of prior-art electronic thermometers. With the circuits designed to accommodate a specific temperature sensor, changing the sensor requires modifying the circuitry. There are no provisions for interchanging sensors and quickly modifying the instrument to work with the new sensor Furthermore, none of the available temperature measuring devices that approach the required accuracy and resolution are suitable for field use. Typical laboratory grade electronic thermometers have accuracies around 0.02° C. to 0.04° C. Most of the instruments require an AC power source, and almost all are limited to use at room temperature for correct operation. None of the available units are sufficiently rugged, waterproof or portable to permit their use outdoors, under extreme climatic conditions.

SUMMARY OF THE INVENTION

Accordingly, among the objects of the present invention are to provide: an improved device for accurately measuring temperature electronically; a device of the foregoing type having a resistance-type thermal sensor, means for accurately measuring electronically the sensor's resistance and means for solving a log-polynomial equation relating resistance to temperature, to directly convert the sensor's resistance to a temperature; a device of the foregoing type having a keyboard for entering the sensor's calibration constants for solution of the equation to permit easy interchange of sensors; and a device of the foregoing type which is rugged, waterproof and portable, and is consistently accurate over extreme climatic conditions The foregoing and other objects of the invention are attained by the electronic thermometer of the present invention in which a calibrated thermistor is used as a thermal sensor with a constant current. The voltage across the sensor is measured by an analog-to-digital converter and converted to a resistance value. Calibration constants of the sensor are entered into a microcomputer which solves a log-polynomial equation relating sensor resistance to temperature, to convert the resistance to a temperature reading displayed on a digital readout. Temperature-related variations in the instrument's circuitry are compensated by the software in the microcomputer.

The known resistance of the thermistor can be used to determine its temperature by use of the known Steinhart-Hart equation, with the constants for the equation being entered via a keyboard into the microcomputer's memory. These constants remain in the instrument until changed to reflect new calibration constants for a new thermal sensor.

Components of the device include operational amplifier circuits forming a constant current source, a resistance-to-voltage converter, an analog-to-digital converter and a microprocessor system. All components are housed in a buoyant, waterproof container.

A better understanding and appreciation of the foregoing description as well as other objects, features and advantages of the invention can be obtained from the following description of a presently-preferred embodiment, when considered in conjunction with the accompanying drawings

DESCRIPTION OF THE PREFERRED EMBODIMENT

The relationship between the resistance of a thermistor and the sensed temperature may be expressed by the following third-order log-polynomial equation:

$$T = \frac{1}{A + B * \ln R + C(\ln R)^3} - 273.15 \quad (1)$$

where:

T is the temperature, in degrees Celsius

R is the sensor's resistance, in Ohms

A, B, C are calibration constants for the sensor.

The sensed temperature can be calculated if the sensor's resistance, R, at this temperature can be determined. The calibration constants A, B and C for the sensor are pre-determined, known values unique to each sensor. The present invention provides the instrument whereby the above equation is automatically solved and the temperature displayed on a readout.

It has been established in the prior literature that if the temperature span between any two adjacent calibration points is less than 50° C., the above equation will reproduce the actual temperature within 0.01° C.

Figure 1:
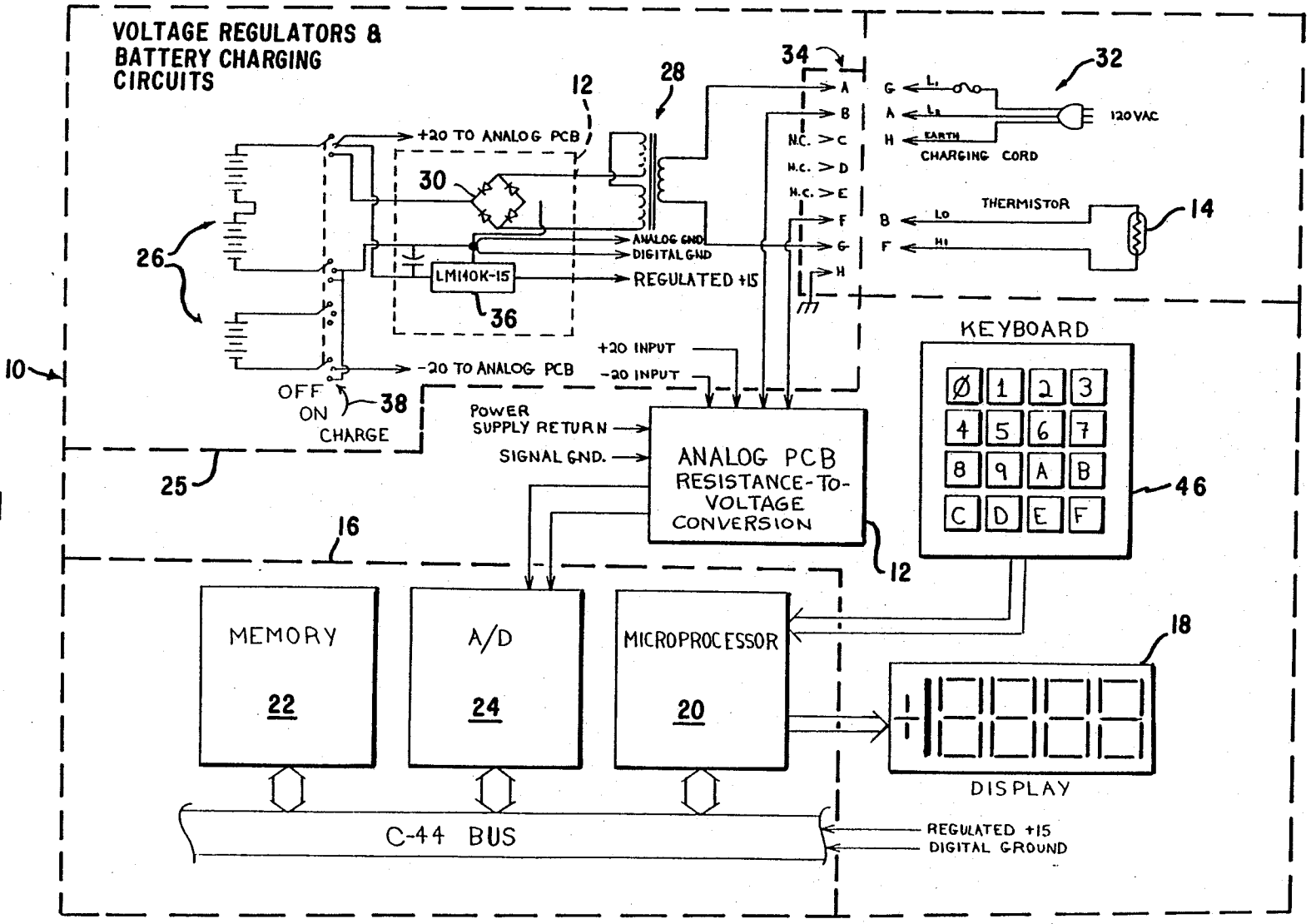
FIG. 1 is a schematic diagram showing the components comprisrng the invention.

The electronics of the instrument, designated generally by the numeral 10 in FIG. 1, includes an analog printed circuit board (PCB) 12 which converts to a voltage the resistance of a thermistor sensor 14, and a low-power microcomputer 16 which converts the voltage to a temperature and displays it on a digital display 18. The microcomputer 16 includes a micorprocessor 20, a memory 22 and an analog-to-digital (A/D) converter 24, mounted on separate printed circuit boards for ease of installation and repair.

Reference numeral 25 indicates the circuits for voltage regulation and battery charging. Power for the instrument 10 is supplied by rechargeable batteries 26 which are recharged by a dual secondary transformer 28, a bridge rectifier 30 and an AC power cord 32 connecting to the instrument via a multiple-pin connector 34. The 20-volt battery voltage is reduced to 15 volts by a voltage regulator 37, See FIG. 1, which may include a three-terminal, 15-volt regulator, LM140K-15, available from National Semiconductor. A selector switch 38 turns the instrument ON and OFF, and connects the charging circuit 28, 30 to the batteries 26.

The analog PCB 12 contains the circuitry to convert the thermistor's resistance to a millivolt value and is divided into two portions. Note FIG. 2. The first portion of the circuit is a voltage-to-current converter 40 and comprises a standard operational amplifier circuit **40*a* which converts the output of a precision voltage reference 42 to a constant current source. A precision voltage reference 42*a*, AD2702UD, available commercially from Analog Devices, is the most stable voltage reference available without an internal heater. It has a nominal output of 10.000 Vdc, with a low (5 ppm/°C.) temperature coefficient. Elimination of the heater minimizes power consumption from the battery power source 26 (FIG. 1). The LM108AHM operational amplifier 40A**, available commercially from National Semiconductors, also has a very low power requirement and low temperature coefficient (1 uV/°C.). All resistors in this part of the circuit have temperature coefficients of only 2 ppm/°C.

Figure 2:
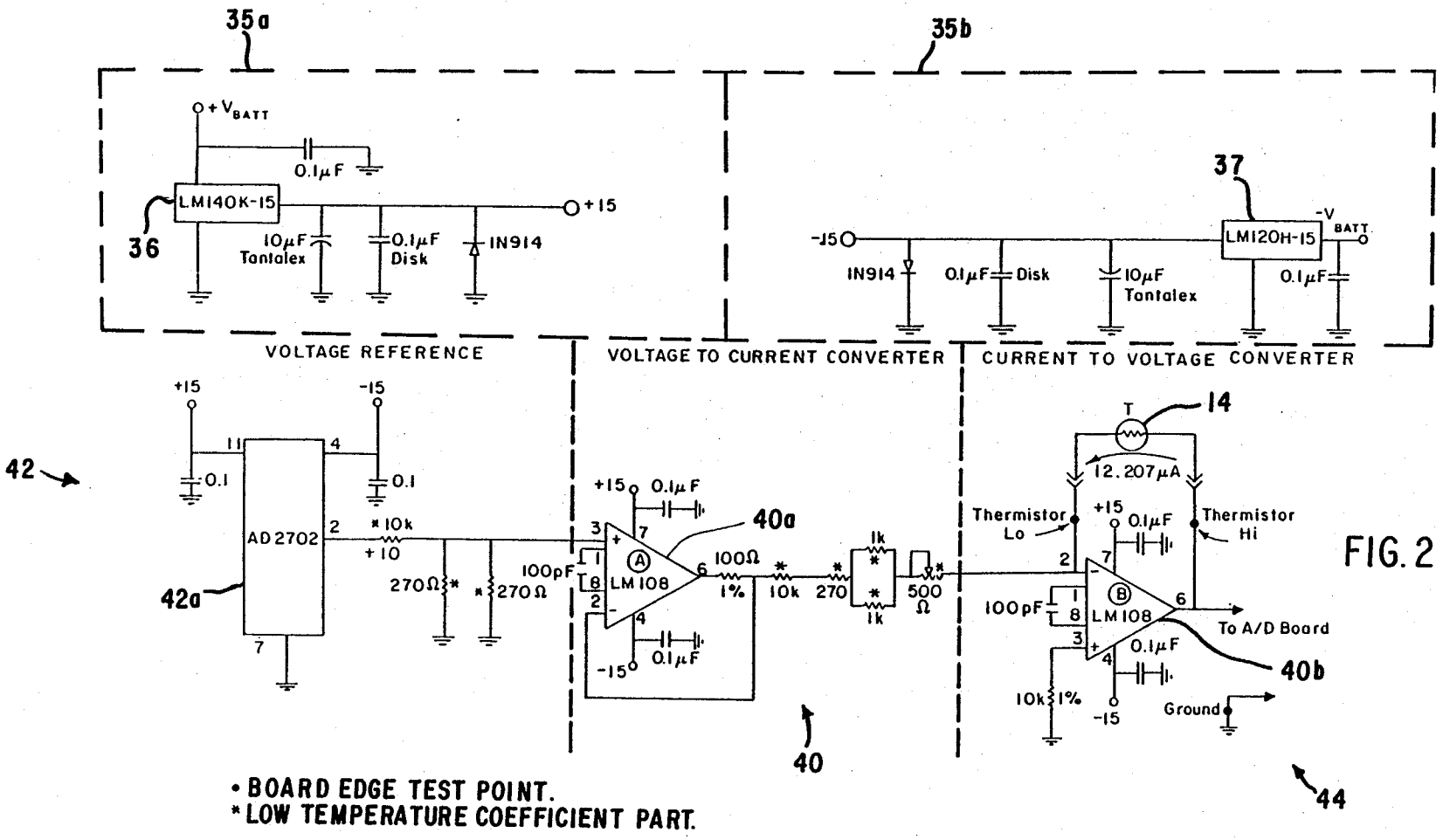
FIG. 2 is a schematic diagram of an analog printed circuit board used in the invention.

The 20-volt power from the batteries 26 is reduced to 15 volts in the voltage regulators 36 and 37, shown in FIG. 2 for the positive and negative voltages, respectively. Included are a LM140K-15 positive voltage regulator similar to the one described above and a similar negative voltage regulator 37, available as LM120H-15 from National Conductor. The regulated +15 and −15 volts are provided to the precision voltage reference 42 and the operational amplifiers **40*a* and 40*b***.

The second portion ofthe circuit is a current-to-voltage converter 44. The thermistor 14 is placed in the operational amplifier's **40*b* feedback loop to assure that a constant current of 12.207 uA is passed through it. The operational amplifier's 40*b*** output voltage is then linearly proportional to the thermistor's resistance.

The microprocessor board 20 in the microcomputer system 16 controls all input-output (I/O) functions, corrects the voltage for temperature-dependent variation, determines the thermistor's resistance, and solves the Steinhart-Hart equation (equation 1, above) to determine the thermistor's temperature. The microprocessor board 20 has a microprocessor, an erasable, programmable, read only memory (EPROM), a random access memory (RAM), and I/O ports which interface with a keyboard 46 and liquid crystal display (LCD) 18. The microprocessor, EPROM, RAM, I/O ports, keyboard and LCD display are known items, available commercially.

The software program and thermistor constants are stored on the memory board 22 having several EPROMs and an electrically alterable, read only memory (EAROM), also a known, standard item. The program is stored in the former and the thermistor calibration constants in the latter.

The A/D converter board 24 uses a CMOS integrating converter to convert the output from the analog PCB 12 to digital. There are eight differential input channels which can be selected individually, and a programmable gain amplifier. These items are known, standard components, and have not been specifically shown in the drawings. Temperature-dependent variations of this circuitry are corrected by the software, as discussed below.

Only two of the eight available channels are used. One channel samples the output of the analog PCB 12 and the other monitors an onboard temperature sensor (not shown), measuring the instrument's internal temperature. This measurement is required to allow the software to compensate for temperature-dependent variations in the analog PCB 12 and the A/D board 24. The output from the internal sensor is linearly proportional to the actual temperature.

The software has two tasks. The first is to control the instrument itself, initializing the instrument 10 when it is turned on, accessing the A/D converter 24, accepting information from the keyboard 46, displaying information on the display 18, etc. The second is to accurately determine the temperature of the thermistor 14 by applying the compensations required due to the instrument's temperature, calculating the thermistor's true resistance, and then solving the Steinhart-Hart equation. Appendix A contains flowcharts and listings for the software.

The software module which accomplishes the first task is labeled METER, and that which accomplishes the second task is labeled TMPCLC, which is called as a subroutine by METER. When the instrument is turned on, the program begins running METER. After initializing the instrument and the A/D circuit board, the program then repeatedly samples the A/D board for a valid reading in a two-step process. First, the programmable operational amplifier is set to the highest amplification, and second, a reading is taken on this range and checked for an over-range indication. If it is not over-range, the program returns to the main loop. If the reading is over-range, the operational amplifier is set to the next lower amplification. The A/D board is sampled and checked again for an over-range condition. This process of reducing the amplification continues through each of the ranges on the A/D board until a valid reading is obtained. This procedure is used to keep the output from the A/D board as large as possible without going over-range, thus providing for the maximum accuracy of the instrument. When a valid reading has been obtained TMPCLC is called and the reading is converted to a temperature.

The keyboard is sampled within the range selection loop. If The "F" key is pressed, the command interpreter subroutine labeled FUNCTION is called. All other keys will be ignored. while in FUNCTION, the thermistor calibration constants in use may be displayed or new ones entered.

The main function of TMPCLC is to convert the output from the A/D converter to a temperature reading. First, TMPCLC reads the thermistor constants from the EAROM, and uses a table to determine the operational amplifier's voltage range and the range-dependent temperature compensation coefficients.

The first compensation is applied to the full-scale voltage of the A/D board at the range selected which, through experimentation, may be described as $$VFS_n = a_n + b_n T + c_n T^2 + d_n T^3 \quad (2)$$

where $VFS_n$ is the full-scale voltage of the nth range, $a_n$, $b_n$, $c_n$, and $d_n$ are the temperature compensation coefficients associated with the nth range, and T is the instrument temperature, determined by the internal sensor.

Next, the output of the A/D board is corrected for temperature according to the equation $$Y = X_1 + m_n T + b_{on} \quad (3)$$

where $X_1$ is the output of the A/D board, $m_n$ and $b_{on}$ are constants associated with the nth range, and T is the instrument temperature. This equation, in effect, applies a temperature-dependent offset shift to the output of the A/D board This off-set was determined through experimentation.

The actual voltage measured by the A/D board is determined by $$MVADC = (Y/4095) * VFS \quad (4)$$

where MVADC is the actual measured voltage, and 4095 is the total number of bits at full scale. Additionally, there is a known offset $F_s$ associated with the analog PCB, which is temperature-dependent, and is determined as $$F_s = a_{pcb} + b_{pcb} T + c_{pcd} T^2 + d_{pcd} T^3 \quad (5)$$

where $a_{pcb}$, $b_{pcb}$, $c_{pcb}$, and $d_{pcb}$ are the temperature compensation coefficients associated with the analog PCB, and T is the instrument temperature.

Finally, the true resistance of the thermistor, RES, can be calculated as $$RES = MVTRUE/12.207E\text{-}06 \quad (6)$$

where RES is the thermistor resistance, in ohms, 12.207E-06 is the constant current passed through the thermistor, and MVTRUE=MVDAC+$F_s$ determined from equations (4) and (5) above. Next, the Steinhart-Hart equation, equation (1), is used to convert the thermistor's resistance to a temperature.

Sources of possible error may be grouped as external to the instrument and internal to the system. Possible errors external to the instrument include the electrical resistance of the probe leads, self-heating of the thermistor probe, uncertainty in the Steinhart-Hart equation and measurement error during thermistor calibration. The probe leads will add resistance in series with the thermistor, and will cause a decrease in the apparent temperature measured. The 6-ft. 18-AWG (American Wire Gauge) stranded probe wire used with the instrument tested by the applicants has a resistance of roughly 30 mΩ, resulting in an apparent temperature decrease of about 0.0001° C. at an ambient temperature of 20° C., which is the worst case.

Self-heating is the increase in temperature of the thermistor from the dissipation of electrical energy within the thermistor itself. Calculations based on dissipation constants for bead thermistors show that for the worst case of still air, the temperature error is only about +0.003° C. For a thermistor immersed in a well-stirred oil bath, the error is only +0.0004° C. the worst case.

It has been shown that if the temperature span between any two adjacent calibration points is less 50° C., the Steinhart-Hart equation will reproduce the actual temperature within 0.01° C. Measurement error during the thermistor calibration is another factor that has to be considered, but may not be readily available.

The remaining sources of error are associated with the instrument itself. The individual errors have been characterized and, where possible, are corrected by the software. The temperature correction equations in TMPCLC play an important role in the instrument; without them its accuracy would not be as high. The following procedure was used to determine the temperatur-dependent variation of the A/D converter board and the analog PCB.

Each was put into a cold chamber and the chamber's temperature varied while the input to each board was held constant. The board output was measured, and a regression analysis performed on the data to relate the board's output to its temperature. Through the tests described, it was found that the offset ($F_s$) of the analog PCB was temperature dependent, and that the offset error is much more significant than gain and nonlinearity errors. The latter two are small enough to be ignored.

The resolution of the liquid crystal display is 0.01° C. This means that the temperatures must be rounded to the nearest 0.01° C. before being displayed. This contributes up to +0.005° C. error, which may be reduced only by using a display with more digits.

The A/D converter's nonlinearity is uncorrectable and contributes ½ bit to the instrument error. The A/D converter's offset is affected by the output impedance of the previous stage; a higher output impedance results in more offset. In the instrument tested by the applicants, the offset was negligible since the operational amplifier in the previous stage has a very low output impedance.

Quantizing error is present whenever there is conversion between analog and digital data. The uncertainty is always $\pm\frac{1}{2}$ of the least-significant-bit of the converter.

The temperature-dependent gain change of the A/D converter is compensated in accordance with equation (2), above. The nominal full-scale voltage ranges are 5.0, 2.5, 1.0, 0.5, 0.25, and 0.1 V, with a set of coefficients for each of the six voltage ranges. The program uses a table to select the proper set of coefficients. The output of the A/D converter is corrected for offset shift by equation (3), above. This offset error is temperature dependent and can be approximated by a linear equation.

The long-term stability of the analog PCB and the A/D converter board circuits are both unknown and uncorrectable. As with most electronic instruments, the electronic thermometer should be recalibrated at least once a year.

An error analysis was performed for two assumed field conditions. The first condition kept the thermistor's temperature at 0° C. while varying the instrument's temperature, and corresponds to water temperature measurements made in the field. The instrument accuracy was calcaulated at 5° C. intervals over the −35° range. The second condition kept both the thermistor and the instrument temperature the same, and corresponds to air temperature measurements made in the field. The instrument accuracy was again calculated at 5° C. intervals over the same −35° to 20° C. range.

The main source of error was the uncertainty associated with regression equations describing the temperature-dependent variation of the A/D board's full-scale voltage. The uncertainty of these regressions, found using the 90% confidence bands, could be reduced by taking more calibration data for the A/D board within the operating temperature range of the instrument.

Table 1 below contains the results of a calibration performed on Jan. 9 and 10, 1985. The instrument was placed in a cold chamber and connected to a known resistance used to simulate a known thermistor. The temperature of the chamber was set and the instrument allowed to reach equilibrium at that temperature. The instrument temperatures were held constant at four temperatures between −18.3° and 24.0° C. For each instrument temperature the simulated thermistor temperatures ranged from −1.0° to 1.0° C. The error calculations in Table 1 are for a thermistor, Model T32A11/21, available from Victory Engineering Company, Springfield, N.J., which has a resistance of 5931.5Ω and a change of 255 Ω/°C. at 0° C.

TABLE 1

| Calibration on 9 and 10 January 1985 (°C.). | | | | |
|---|---|---|---|---|
| Simulated | Error* | Simulated | Error* | |
| Ambient temperature 24.0° C. | | | | |
| −1.00 | 0.00 | 1.00 | 0.00 | |
| −0.50 | 0.00 | 0.50 | 0.00 | |
| −0.40 | 0.00 | 0.40 | −0.01 | 0.00 |
| −0.30 | 0.00 | 0.30 | −0.01 | 0.00 |
| −0.20 | 0.00 | 0.20 | −0.01 | 0.00 |
| −0.10 | 0.00 | 0.10 | 0.00 | −0.01 |
| 0.00 | 0.00 | | | |
| Ambient temperature 3.9° C. | | | | |
| −1.00 | −0.03 | 1.00 | −0.01 | 0.00 |

TABLE 1-continued

| Calibration on 9 and 10 January 1985 (°C.). | | | | | |
|---|---|---|---|---|---|
| Simulated | Error* | | Simulated | Error* | |
| −0.50 | −0.01 | | 0.50 | −0.01 | 0.00 |
| −0.40 | −0.02 | | 0.40 | −0.01 | −0.02 |
| −0.30 | 0.00 | −0.01 | 0.30 | −0.01 | |
| −0.20 | 0.00 | −0.01 | 0.20 | −0.01 | 0.00 |
| −0.10 | −0.02 | −0.01 | 0.10 | −0.01 | |
| 0.00 | −0.01 | | | | |
| Ambient temperature −8.3° C. | | | | | |
| −1.00 | 0.00 | 0.01 | 1.00 | 0.01 | 0.00 |
| −0.50 | 0.00 | | 0.50 | 0.00 | 0.01 |
| −0.40 | 0.00 | | 0.40 | 0.00 | |
| −0.30 | 0.00 | | 0.30 | 0.00 | |
| −0.20 | 0.00 | | 0.20 | 0.00 | |
| −0.10 | 0.00 | | 0.10 | 0.00 | |
| 0.00 | 0.00 | | | | |
| Ambient temperature −18.4° C. | | | | | |
| −10.0 | −0.02 | | 10.0 | 0.04 | |
| −1.00 | 0.01 | | 1.00 | 0.01 | |
| −0.50 | 0.01 | | 0.50 | 0.01 | |
| −0.40 | 0.01 | 0.00 | 0.40 | 0.01 | |
| −0.30 | 0.01 | | 0.30 | 0.00 | 0.01 |
| −0.20 | 0.01 | 0.00 | 0.20 | 0.01 | 0.02 |
| −0.10 | 0.01 | | 0.10 | 0.01 | 0.02 |
| 0.00 | 0.01 | 0.00 | | | |

*Two listings means that the LCD was continually shifting between them.

Each error was converted to an equivalent number of bits at the A/D board; then all the bits were summed to produce the total system error. The total system error in bits was changed to an equivalent temperature, and describes the error band about the actual temperature The measured error was considerably less than the theoretical error.

All components of the instrument 10 are housed in a small, portable container, approximately the size of a lunch pail, which is waterproof and buoyant. After installation of the components, the container is completely sealed to ensure total waterproofness. The thermistor 14 is coupled to the instrument 10 via the multiple-pin connectors 34. Similarly, the AC line cord 32 for recharging the batteries 26 is coupled to the instrument 10 via the connectors 34. The other end of the cord 32 is plugged into a conventional outlet, and the selector switch 38 turned to the CHARGE position if the batteries 26 require recharging. Conveniently, the connectors 34, selector switch 38 and keyboard 46 are located on the top panel of the instrument for easy access. The connecting pins for the thermistor 14 and line cord 34 are appropriately wired internally to effect proper connections.

In use, the thermistor 14 is connected to the instrument 10 and the selector switch 38 turned to the ON position. If calibration constants for the thermistor 14 are in memory, the actual temperature will be shown on the display 18. If different constants are required, such as when using a new thermistor, the "F" key on the keyboard 46 is pressed to invoke the FUNCTION mode. While in this mode, new constants may be entered and verified on the display 18, or the values in memory can be viewed.

A constant current from the circuit portion 40 of the analog PCB 24 is passed through the thermistor 14, developing a voltage across it which is proportional to its resistance. Note circuit portion 44 of the analog PCB 24, FIG. 2. This voltage is measured by the A/D converter 24 (equation 4), and the thermistor's resistance calculated according to equation (6). The resistance is used in equation (1) to calculate the temperature T which is displayed on the display 18. The temperature-related variations in the instrument's circuitry discussed above (equations 2, 3 and 5) are compensated as disclosed and the appropriate corrections incorporated into the software and reflected in the calculated temperature T.

Use of complimentary metal oxide semiconductor (CMOS), digital integrated circuits (IC's) and linear IC's fabricated to military specifications enables the instrument to operate over a wide temperature range, with an accuracy of ±0.02° C. maintained over an ambient temperature range of −35° C. to +20° C.

With the foregoing disclosure, it is apparent that various modifications may be made. Use of a 14- or 16-bit analog-to-digital converter, for example, would result in more precise measurement of the sensor's resistance and hence improve the instrument's accuracy and precision. Provisions may be made to automatically and continuously calibrate the circuitry. A very precise, low-temperature coefficient resistor may switched into the circuit in place of the sensor, and its voltage measured. This standard resistor is then replaced by a short circuit. The circuit's actual gain and offset is calculated from these two readings The sensor, here a thermistor, may then be switched back into the circuit, and the voltage measured. These correction factors are then applied to the sensor's apparent resistance. This procedure will eliminate costly and labor intensive calibration of each analog circuit board.

The basic instrument described above may be used with different sensors, provided the sensor's output can be calibrated and represented by a polynomial equation. Examples of such sensors include load cells, strain gauges, light sensors and humidity sensors.

Although a preferred embodiment of the present invention has been described, it is to be understood that modifications and variations may be made by those skilled in the art without departing from the spirit of the invention, and such modifications and variations are considered to be within the purview and scope of the invention as defined by the appended claims.

What is claimed is:

1. A temperature measuring apparatus of the type wherein the electrical resistance characteristic of a thermal sensor is measured and used to determine temperature, comprising:

a resistance-type thermal sensor having a temperature-resistance relationship given by $$T = \frac{1}{A + B * \ln R + C * (\ln R)^3} - 273.15$$

where: T is temperature, in degrees Celsius; R is the sensor's electrical resistance, in Ohms; and A, B and C are calibration constants for the sensor:

means for providing a substantially constant electrical current to said sensor;

means for measuring the voltage produced across said sensor at said constant current, said voltage varying according to changes in the temperature of said sensor;

means for determining the resistance of said sensor from said voltage in accordance with Ohm's law, and for determining the sensor's temperature from said temperature-resistance relationship;

means for displaying said determined temperature; and means for providing said sensor calibration constants A, B ,C to said determining means for the determination of said temperature.

2. An apparatus as set forth in claim 1, wherein said means for providing said sensor calibration constants comprises a keyboard.

3. An apparatus as set forth in claim 2, wherein said determining means comprises processor circuitry provided with logic to determine the resistance of said sensor and said temperature, and to provide said temperature to said display means.

4. An apparatus as set forth in claim 3, wherein said processor circuitry further includes logic to correct said measured voltage for temperature-dependent variations.

5. An apparatus as set forth in claim 4, wherein said thermal sensor is a thermistor.

6. A temperature measuring system of the type wherein the electrical resistance of a thermal sensor is measured and used to determine temperature, comprising:

a thermistor sensor having a temperature-resistance relationship given by $$T = \frac{1}{A + B * \ln R + C * (\ln R)^3} - 273.15$$

where: T is temperature, in degrees Celsius; R is the sensor's electrical resistance, in Ohms; and A, B and C are calibration constants for the sensor;

a source of substantially-constant electrical current;

circuitry for measuring the voltage across said sensor at said constant current, said voltage varying according to changes in the temperature of said sensor;

computing logic means for determining the resistance of said sensor from said voltage and for determining the sensor's temperature from said temperature-resistance relationship;

digital display means for displaying said determined temperature; and data entry means for providing said computing logic means with said sensor calibration constants A, B, and C.

7. A system as set forth in claim 6, wherein said data entry means comprises a keyboard.

8. A system as set forth in claim 7, wherein said source of substantially-constant current comprises:

a battery power source; and circuitry to convert the voltage from said battery power source to a constant current.

9. A system as set forth in claim 8, wherein said conversion circuitry includes operational amplifier circuitry to provide said sensor voltage linearly proportional to said sensor resistance.

10. A system as set forth in claim 9, wherein said determining means comprises processor circuitry provided with logic to determine the resistance of said sensor and said temperature, and to provide said temperature to said display means.

11. A method for measuring temperature wherein the electrical resistance characteristic of a thermal sensor is measured and used to determine temperature, comprising:

using a resistance-type thermal sensor to measure the temperature, said sensor having a temperature-resistance relationship given by $$T = \frac{1}{A + B * \ln R + C * (\ln R)^3} - 273.15$$

where: T is temperature, in degrees Celsius; R is the sensor's electrical resistance, in Ohms; and A, B and C are calibration constants for the sensor:

applying a substantially constant electrical current to said sensor;

measuring the voltage produced across said sensor at said constant current, said voltage varying according to changes in the temperature of said sensor;

determining the resistance of said sensor from said voltage in accordance with Ohm's law;

providing said calibration constants A, B C for the sensor being used for the determination of said temperature, and determining the sensor's temperature from said temperature-resistance relationship; and displaying said determined temperature.

12. A method as set forth in claim 11, further comprising correcting the measured voltage across said sensor for temperature-dependent variations.

13. A method as set forth in claim 12, wherein said sensor is a thermistor.

14. A method as set forth in claim 13, wherein said calibration constants are provided with a keyboard.

15. A method as set forth in claim 14, further comprising changing the thermal sensor to a different sensor having a second set of calibration constants, and providing said second set of constants for said different sensor via entry with said keyboard.

* * * * *